United States Patent [19]

Ginzboorg

[11] Patent Number: 5,898,672
[45] Date of Patent: Apr. 27, 1999

[54] OVERLOAD PREVENTION IN A TELECOMMUNICATION NETWORK NODE

[75] Inventor: Philip Ginzboorg, Helsinki, Finland

[73] Assignee: Nokia Telecommunications Oy, Espoo, Finland

[21] Appl. No.: 08/836,832

[22] PCT Filed: Nov. 10, 1995

[86] PCT No.: PCT/FI95/00617

§ 371 Date: May 9, 1997

§ 102(e) Date: May 9, 1997

[87] PCT Pub. No.: WO96/15634

PCT Pub. Date: May 23, 1996

[30] Foreign Application Priority Data

Nov. 11, 1994 [FI] Finland ................................. 945332

[51] Int. Cl.⁶ ............................................. H04J 1/16
[52] U.S. Cl. ............................................. 370/236; 370/410
[58] Field of Search ................................. 370/229, 230, 370/231, 234, 235, 236, 410, 412, 413, 252, 253; 378/112, 207, 203, 220, 221, 269, 279

[56] References Cited

U.S. PATENT DOCUMENTS

| | | |
|---|---|---|
| 5,029,164 | 7/1991 | Goldstein et al. . |
| 5,060,258 | 10/1991 | Turner . |
| 5,090,011 | 2/1992 | Fukuta et al. ........................... 370/229 |
| 5,309,431 | 5/1994 | Tominaga et al. . |
| 5,425,086 | 6/1995 | Hidaka et al. . |
| 5,450,483 | 9/1995 | Williams ................................. 379/279 |
| 5,602,841 | 2/1997 | Lebizay et al. ......................... 370/413 |
| 5,673,252 | 9/1997 | Johnson et al. ......................... 370/235 |

FOREIGN PATENT DOCUMENTS

425 202  5/1991  European Pat. Off. .

OTHER PUBLICATIONS

"Specifications of Signalling System No. 7" (Q.700), International Telecommunication Union (Mar. 1993), pp. 1–20.
"Series E: Telephone Network and ISDN," (E.412), International Telecommunication Union (Oct. 1996), pp. 1–16.
"Digital Exchanges," (Q.542), International Telecommunication Union (Mar. 1993), pp. 1–21.
European Telecommunications Standard Institute standard ETSI IN SC1 Part 1: Protocol Specification, Draft prETS 300 374–1, Nov. 1993, pp. 47–50, 165–172, 189–192.
Proceeding of the IEEE, vol. 80, No. 4, Apr. 1992, B.Jabbari, "Routing and Congestion Control in Common Channel Signaling System No. 7" pp. 607–617.

*Primary Examiner*—Ajit Patel
*Assistant Examiner*—Chiho Andrew Lee
*Attorney, Agent, or Firm*—Pillsbury Madison & Sutro LLP

[57] ABSTRACT

A method and an arrangement for preventing an overload in a telecommunications network node where a service node transmits restriction requests to other nodes, so that the nodes will restrict the number of service requests towards the service node, including adding to a restriction request restriction parameters. The other nodes transmit the parameters they use, back to the service node, and the service node compares those parameters with the parameters it has transmitted to decide whether a restriction request is to be transmitted to the node which transmitted the parameters.

11 Claims, 8 Drawing Sheets

OVERLOAD PREVENTION IN A TELECOMMUNICATION NETWORK NODE

This application is the national phase of international application PCT/FI95/00617 filed Nov. 10, 1995 which designated the U.S.

FIELD OF THE INVENTION

The invention relates generally to traffic control in telecommunication networks. More specifically, the invention relates to a method and an arrangement for preventing an overload in a telecommunication network.

The invention is intended especially for so-called Intelligent Networks (IN) that are being developed at present, but the same principle can be applied in any network wherein two or more nodes are interconnected in such a way that at least one of the nodes can be loaded by one or several other nodes.

BACKGROUND OF THE INVENTION

An Intelligent Network usually refers to a network comprising more intelligence (i.e. a better ability to utilize information stored in the network) than the present public (switched) networks. Another characteristic of the Intelligent Network is that the network architecture somehow draws a distinction between, on the one hand, the operations concerning the switching itself and, on the other hand, the stored data and its processing. Such a division makes it possible that, in principle, the organization providing network services can be different from the organization managing the physical network in which the services are provided. Conceptually, an Intelligent Network can be divided into three parts. The first part comprises the nodes switching traffic (performing connections), the second part contains the services provided by the network, and the third part consists of the internodal communication protocol, i.e. the "language" the machines use to communicate with one another. Since all services must be presented as a sequence of messages conforming with the protocol, the protocol defines the "intelligence" of the network.

Figure 1:
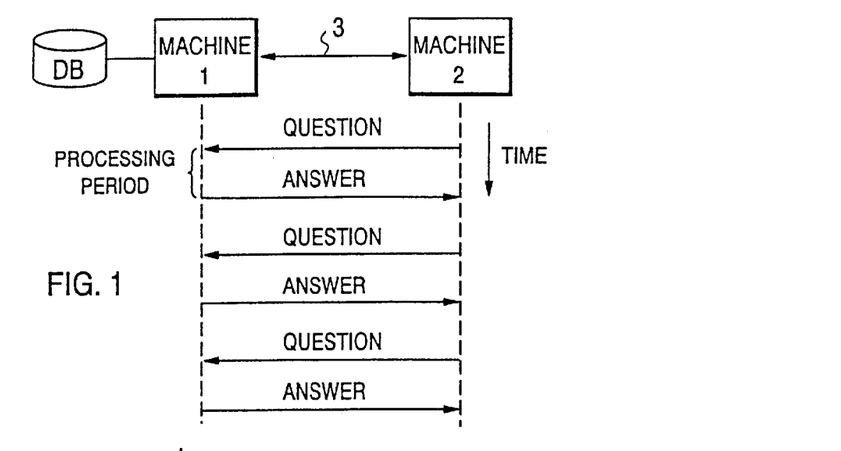
FIG. 1 illustrates the questions traffic between two machines.

In order to facilitate the understanding of the present invention, reference is first made to a simple basic situation illustrated in FIG. 1, wherein two machines (or network nodes) 1 and 2 are shown, the machines being interconnected by means of a signalling link 3. Machine 1 comprises a database DB, and machine 2 is a client asking questions from machine 1 by transmitting messages to machine 1 over the link 3. When machine 1 receives a question, it initiates a transaction resulting in an answer after a certain processing period. When the answer is ready, machine 1 transmits it to machine 2 over the link 3. Each answer costs machine 2 a certain sum.

Figure 2A:
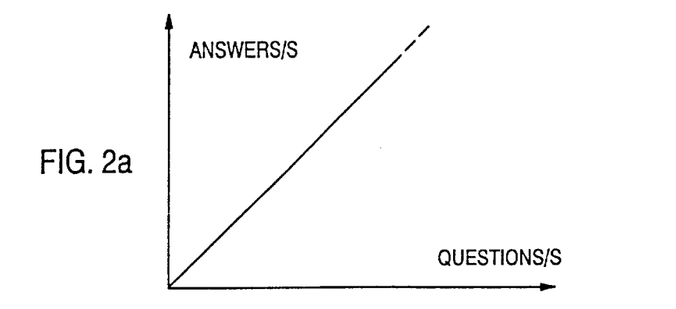
FIG. 2a illustrates a response of a hypothetical machine to service requests.
Figure 2B:
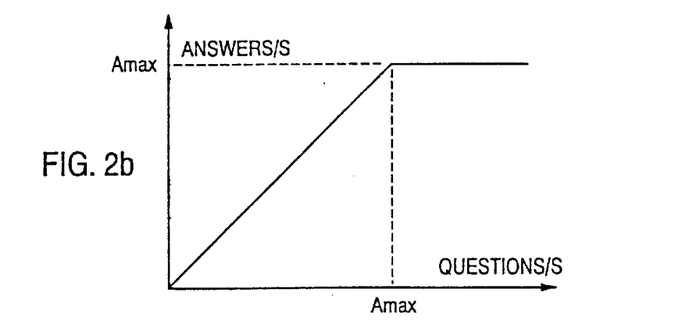
FIG. 2b illustrates a response of an omnipotent machine to service requests.
Figure 2C:
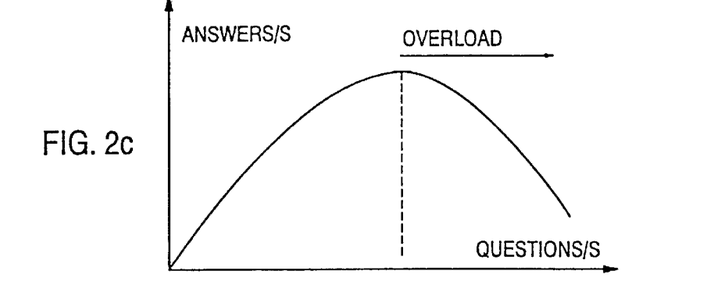
FIG. 2c illustrates a response of a real machine to service requests.

A theoretical omnipotent machine 1 would answer each question immediately so that the correlation between the questions rate (questions per time unit) and the answering rate (answers per time unit) would look like the description in FIG. 2a. However, there is in practice a limit to how fast machine 1 can provide answers. Taking this into account, the response curve of the omnipotent machine 1 becomes like the one shown in FIG. 2b. When the questions rate exceeds a certain threshold Amax corresponding to the highest possible answering rate, the latter remains constant, i.e. some of the questions will not be answered. However, this situation does not correspond to a real situation, either. In practice, the situation is such that as the questions rate exceeds a certain threshold value for a long period of time, machine 1 becomes overloaded so that the increasing questions rate further reduces the answering rate. This situation is illustrated in FIG. 2c. The decreasing answering rate is due to the fact that the machine starts wasting its resources, for example in such a way that it reserves more and more free memory for storing the questions, so there will be correspondingly less and less memory available for computing the answers. The threshold value of the questions rate at which an overload situation occurs is not constant, but it depends on how much of the capacity of machine 1 is dedicated to answering. For example, the threshold value is lower than usual when the database DB of machine 1 is being updated.

The purpose of any overload prevention method is to make the curve (FIG. 2c) describing a real situation resemble as closely as possible the curve (FIG. 2b) describing an ideal situation. On the other hand, it is reasonable to provide the overload prevention of machine 1 partly in machine 2, so that machine 2 would not have to load the transmission connection between the machines by transmitting messages that would be discarded by machine 1.

Suppose that in order to protect itself, the overloaded machine 1 transmits to machine 2 a restriction or filtering request with which it requests machine 2 to reduce the number of questions to be transmitted. Such a request typically contains two restriction parameters: the upper limit of the questions rate U (i.e. the upper limit of the number of questions performed per time unit) and the duration of the filtration T (i.e. of the restriction). When machine 2 receives such a request, it begins to filter (restrict) the questions traffic so that the questions rate will be at most U, so that part of the questions will fail (they will not even reach machine 1). Machine 2 continues this restriction operation for the period of time T indicated in the restriction request. If machine 2 receives a new request during this period, the upper limit of the questions rate and the interval will be updated to correspond to the new values. Instead of the upper limit of the questions rate, the parameter U may also indicate the percentage of all service request messages machine 2 should transmit to machine 1. For the sake of clarity, only the former meaning (upper limit of the questions rate) will be used hereinafter for the parameter U.

When machine 2 uses the above-described overload prevention mechanism, it has two problems.

The first problem is how to select the aforementioned parameters U and T. A long filtration time T and a low value of the parameter U diminish the overload, but they also entail a clearly lower revenue for machine 1. On the other hand, a short filtration time and a higher value for the parameter U do not necessarily reduce the number of questions sufficiently for the overloading situation to be cleared up, and an overloading situation also means a lower revenue.

Figure 3:
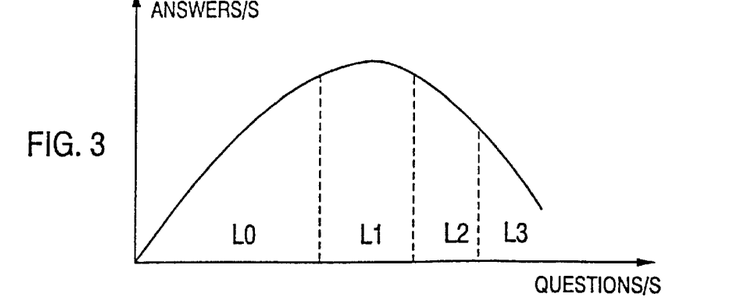
FIG. 3 illustrates the division into different load levels, performed in a node.

A simple way of eliminating this problem is to divide the response characteristic into consecutive overload regions Ln (n=0,1,2 . . . ) according to FIG. 3, each of the regions having its own values for the parameters U and T. If, at all times, machine 1 is able to determine its own load level, then the restriction parameters can be stored in the machine in a format (Ln: T, U), so that the machine can retrieve the required values of the parameters T and U on the basis of the load level Ln. However, this does not quite eliminate the aforementioned problem, but shifts the trouble of selecting the parameters to the operator. There are also methods by means of which the parameters can be selected automatically, based on the utilization ratio of the machine.

The other problem relates to when to send and when not to send restriction requests. Machine 1 should transmit the first restriction request when it is close to becoming overloaded. It should then send a restriction request either when the restriction period T expires (if the overload condition is still on) or when the restriction parameters change. Machine 1 should not transmit new restriction requests if machine 2 restricts the questions correctly (with the right threshold value for the questions rate and the right filtration time T). However, since there is no feedback, machine 1 cannot know if and how machine 2 restricts the questions. If machine 2 is the only source of questions, then machine 1 can solve the problem by monitoring the questions rate and by transmitting a new restriction request when the rate of the incoming questions exceeds the allowed threshold value U. If there are several machines transmitting questions, then efficient bookkeeping is required to monitor the traffic and this makes the arrangement complicated.

This second problem is thus of the synchronization type, since machine 1 must keep up to date (i.e. synchronize) the restriction entity that is in a remote machine according to the loading situation of machine 1 at each moment.

The overload prevention in the Intelligent Network operates in a manner that is very similar to the above-described example. The Intelligent Network architecture is based on service switching points (SSP) and service control points (SCP) that make decisions concerning for example the routing and the charging of the calls. The Service Control Points, which are typically clearly fewer in number than the SSPs, contain knowledge of what the different services do and how to access the data that the services need. In an Intelligent Network, a Service Control Point is like the machine 1 of the above-described example, containing a database, and the SSP is like the machine 2 that asks questions. The above-described synchronization is also a problem in the Intelligent Network since the communication protocol between the nodes is not reliable in this respect.

Figure 4A:
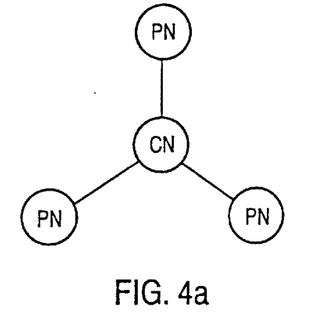
FIG. 4a shows a star network comprising four nodes.
Figure 4B:
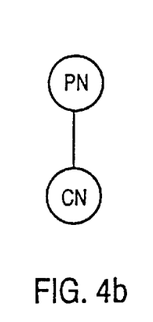
FIG. 4b shows a star network in its simplest form.
Figure 4C:
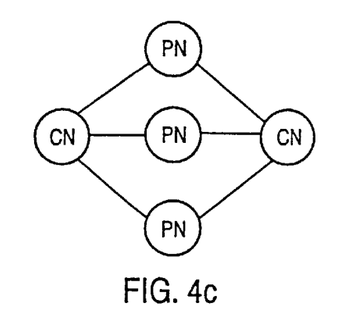
FIG. 4c shows a star network comprising two superimposed star networks sharing peripheral nodes.

The above-described example concerned a network that was as simple as possible with respect to its topology. For example an Intelligent Network is a network with a (typically) star topology. A star network basically comprises two kinds of nodes: central nodes and peripheral nodes. Peripheral nodes generate traffic that flows towards the central node. When the Intelligent Network comprises more than one SCP, the architecture corresponds to several superimposed star networks sharing peripheral nodes. FIGS. 4a to 4c illustrate the above-described alternatives with reference CN (in the IN: SCP) denoting a central node and reference PN (in the IN: SSP) denoting a peripheral node. FIG. 4a shows a star network having one central node CN and three peripheral nodes PN. FIG. 4b shows a star network in its simplest form corresponding to the example of FIG. 1 (one central node and one peripheral node), and FIG. 4c shows two star networks sharing peripheral nodes PN.

In addition to the Intelligent Network, many other networks have a star topology. Examples of such networks include a network formed of a satellite and earth stations, wherein the satellite switches traffic generated by the earth stations, or a network consisting of a base station controller and base stations of a cellular network.

In some known (intelligent) networks, the above-described synchronization is implemented with a broadcasting method, wherein the central node transmits a common restriction request to all the peripheral nodes connected thereto whenever its load level changes (or the restriction parameters change for some other reason, for example when the operator changes them) and the peripheral nodes respond to each restriction request they receive with an acknowledgment. The central node keeps a record of the acknowledgement messages, and if some nodes have not transmitted an acknowledgement message within a certain control period, the central node retransmits the restriction request to these nodes. The broadcast is repeated again to all the nodes as the restriction period (T) expires if the overload condition is still on. However, it is difficult to implement such a method in a typical network comprising several nodes, and in addition the method is not reliable, since a peripheral node may be damaged for example immediately after it has transmitted the acknowledgement message, in which case the central node will not be informed of the situation. Another drawback of such a method is that the central node also transmits a restriction request in vain to nodes which cause an insignificant loading on the central node (this could only be avoided by monitoring separately the traffic from each peripheral node, which, however, is a complicated and therefore undesirable solution).

The latter problem has been solved in some known Intelligent Networks in such a way that as the restriction parameters change, a restriction request is always transmitted in response to a service request message (which may be, for example, the question of the example provided in the beginning) sent by a peripheral node. Therefore, the peripheral nodes with light traffic will correspondingly receive fewer restriction requests. The drawback of this method is, however, that it causes a great deal of traffic over the signalling link between the central node and a peripheral node. It also causes a large number of updates in the peripheral node.

SUMMARY OF THE INVENTION

The purpose of the present invention is to provide a new kind of arrangement by means of which the above-described drawbacks can be eliminated and synchronization can be implemented in a simple and sufficiently reliable manner (i.e. that the loading machine operates as well as possible in accordance with the current load level of the loaded machine). That purpose is achieved with the method according to the invention that is characterized in that the service node adds to the restriction request it transmits information identifying the group of parameters, on the basis of which the node should perform restriction, the node copies said information into its memory and transmits the data identifying the groups of parameters it uses back to the service node, and the service node compares said data with the data it has transmitted, and decides on the basis of the comparison whether a restriction request is transmitted to the node which transmitted the data. The arrangement according to the invention is in turn characterized in that the network service node comprises comparing means for comparing the data stored in the node and identifying the group of parameters to corresponding data received from another network node, the comparing means being operationally connected to control the transmission of the restriction request from the service node.

The idea of the invention is to maintain, in a node providing services, information identifying the restriction parameters currently utilized and to transmit this data together with the restriction request first to another node to be stored there, and to transmit then the data identifying the restriction parameters used by this other node back to the node providing services, so that the latter can conclude on the basis of the received data whether the other node restricts the traffic and if it restricts it in the correct manner.

In an individual overloading situation, the first restriction request that contains the data identifying the new restriction parameters can be transmitted from the node providing services either automatically (without an incoming service request) or in response to an incoming service request. Furthermore, the restriction request may either be an individual message or it may be contained in a message that would in any case be provided in response to the service request message.

Due to the arrangement according to the invention, synchronization can be implemented very reliably in a simple manner.

BRIEF DESCRIPTION OF THE DRAWINGS

The invention and its preferred embodiments will be described in greater detail below with reference to the examples accord ng to the accompanying drawings, in which.

DETAILED DESCRIPTION OF A PREFERRED EMBODIMENT OF THE INVENTION

Figure 5:
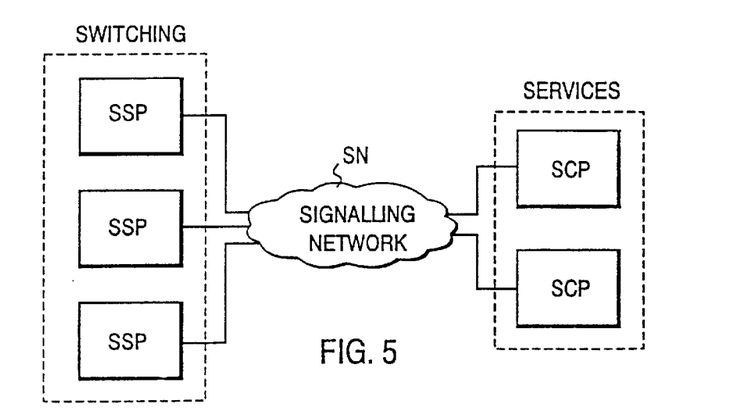
FIG. 5 shows an intelligent network comprising two central nodes and three peripheral nodes.
Figure 6:
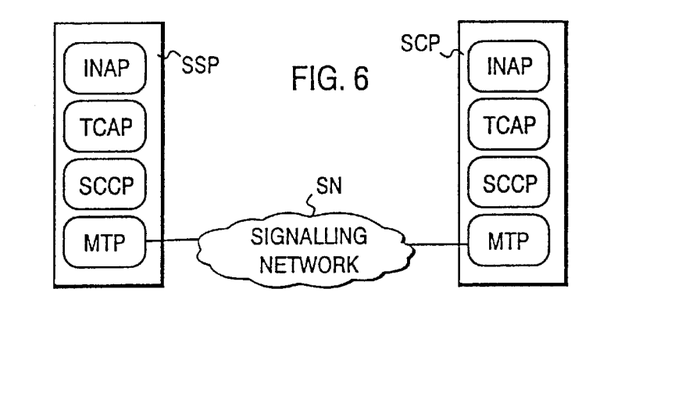
FIG. 6 illustrates the communication between the nodes in an intelligent network.

In the following, the invention will be described in greater detail by using as an example a (star) Intelligent Network wherein calls are transmitted. As described above, the architecture of the Intelligent Network is based on service switching points (SSP) and service control points (SCP). These nodes are interconnected by means of a network SN according to the signalling system number 7 (SS7; described in greater detail in the CCITT Blue Book *Specifications of Signalling System* No. 7, Melbourne 1988), in the manner shown in FIG. 5. In mutual communication the SSP and the SCP utilize the Intelligent Network application protocol (INAP) described in the ETSI (European Telecommunications Standard Institute) standard ETSI IN CS1 INAP Part 1: Protocol Specification, Draft prETS 300 374-1, November 1993. In the SS7 protocol stack illustrated in FIG. 6, the INAP is the upmost layer situated on top of the Transaction Capabilities Application Part (TCAP), the Signalling Connection Control Part (SCCP) and the Message Transfer Part (MTP). The SSP is generally a commercial telephone exchange with a modified call control software, and the SCP comprises the service control logic and has access to the services database. Call traffic passes through the SSPs. The Service Control Points make some of the decisions concerning the routing and the charging of the calls. During a call in the Intelligent Network, there may be one or more INAP dialogues between the SSP and the SCP. Each of these dialogues begins with a predetermined message (initial detection point message) hereinafter referred to as an initial message.

When the network traffic is heavy, the SCP may become overloaded. In order to prevent this, the Intelligent Network has a decentralized load control system that uses a so-called call gapping method to restrict messages arriving towards the SCP (the term "call gapping" is used in several international standards, for example in the CCITT Blue Book, Recommendation E.412, §3.1.1.2 and Recommendation Q.542, §5.4.4.3). The call gapping method is a known traffic control method that is based on the frequency of call occurrence (rate of arrival), in which method the number of calls is limited in such a way that at most a certain maximum number of calls per time unit are allowed to pass. In addition to the aforementioned standards, such a method is also described for example in U.S. Pat. No. 4,224,479. The SCP monitors the loading situation and the SSPs restrict the traffic, if necessary, by rejecting some of the calls before the related dialogue is started.

Figure 7A:
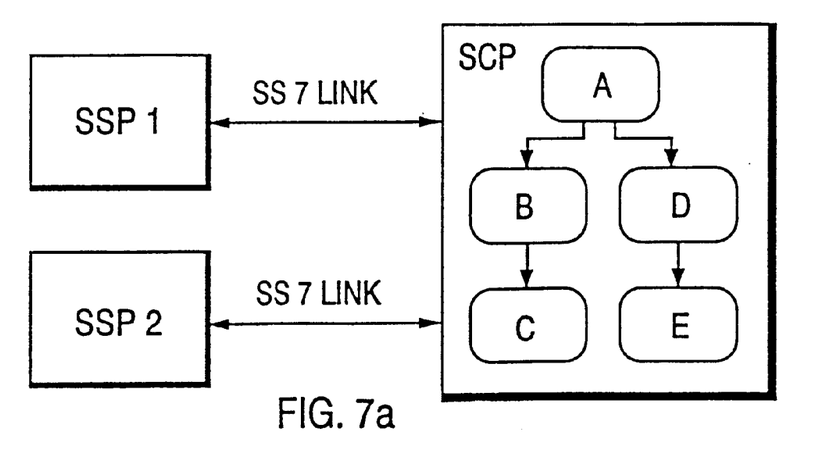
FIG. 7a illustrates an intelligent network and the formation of its central node from functional blocks situated at different hierarchical levels.
Figure 7B:
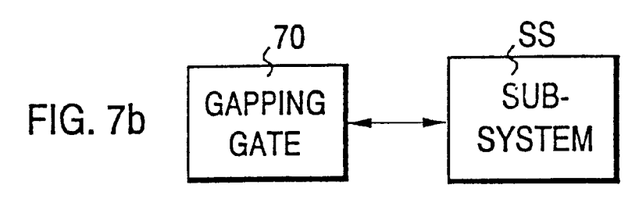
FIG. 7b shows the division of one block shown in FIG. 7a with respect to the call restriction function.

Assume that the network comprises, in the manner shown in FIG. 7a, two nodes SSP1 and SSP2, and one SCP. The SCP can be considered to contain a hierarchy of functional blocks A to E. Each block can be considered to comprise, according to FIG. 7b, a gapping gate 70 operating according to the call gapping method, and a subsystem SS located behind the gapping gate. All telecommunication with the subsystem passes through the gapping gate, and the gapping gate gathers statistics about the traffic, the condition of the subsystem, and the condition of the other parts of the SCP. From this data the gapping gate calculates the load level of the subsystem in question.

Figure 8:
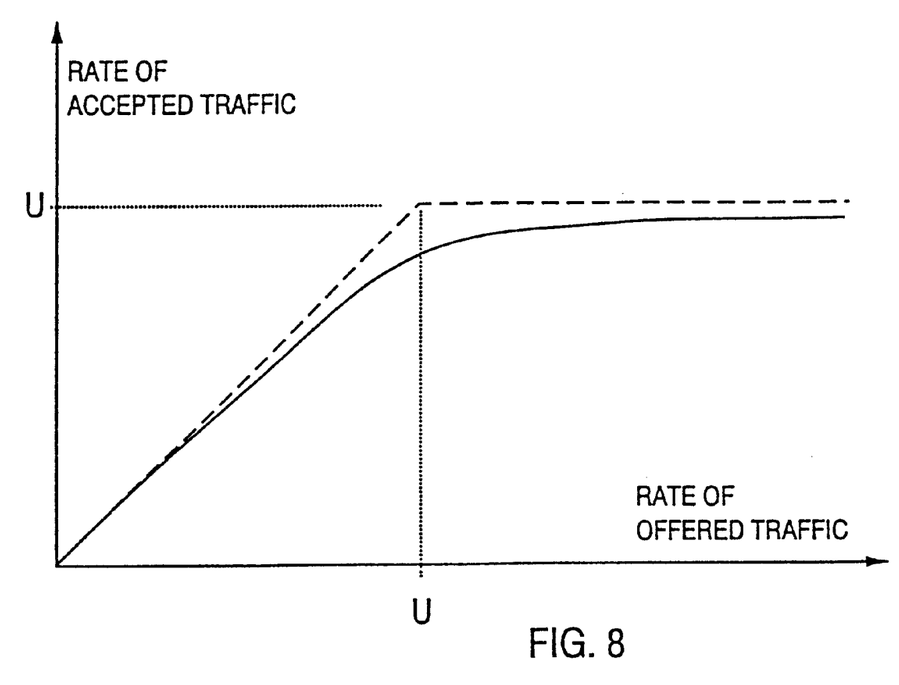
FIG. 8 illustrates the operation of a known traffic restriction method.

The normal load level of the subsystem is L0 (cf. FIG. 3). When the load level changes from L0 to L1, the gapping gate will try to limit the traffic by sending a call gapping request to both SSPs. Such a request typically comprises the following groups of parameters: (1) gap criteria, (2) gap indicators, and (3) gap treatment. The gap criteria identify the portion of the traffic that is the object of the call gapping operation, for example, only calls starting with 800 can be limited. Gap indicators define the maximum number of initial messages (calls) U allowed in a time unit (in fact the gap indicators define the shortest allowable interval I=1/U between two successive initial messages, which, in principle, amounts to the same thing) and the duration of the restriction T, whereupon the rate of initial messages between the arrival of the call gapping request and the end of the duration can be at most the aforementioned maximum. The operation of this call gapping method is illustrated in FIG. 8. When the traffic rate (shown on the horizontal axis) offered by the network is less than the aforementioned maximum U, there is no call gapping. When the offered traffic rate exceeds this value, the SSP rejects some of the calls so that the rate of the transmitted traffic (shown on the vertical axis) will be U. An ideal case is described by a broken line, and a real situation by a continuous line. In practice, the characteristic is a continuous approximation of the piecewise linear characteristic of the ideal case. This is due to the fact that the offered traffic is not divided evenly on the time axis.

The gap treatment parameters determine what to do with rejected calls. For example, the speech channel of a rejected call can be connected to a voice announcement or to a busy tone. In addition, the call gapping request contains a control field which indicates whether the call gapping request comes from an automatic overload prevention mechanism or from an SCP operator. The above-described groups of parameters are disclosed in the aforementioned standard ETSI IN CS1 INAP Part 1: Protocol Specification, Draft prETS 300 374-1, November 1993, Item 7.3.6, which is referred to for a more detailed description.

Figure 9:
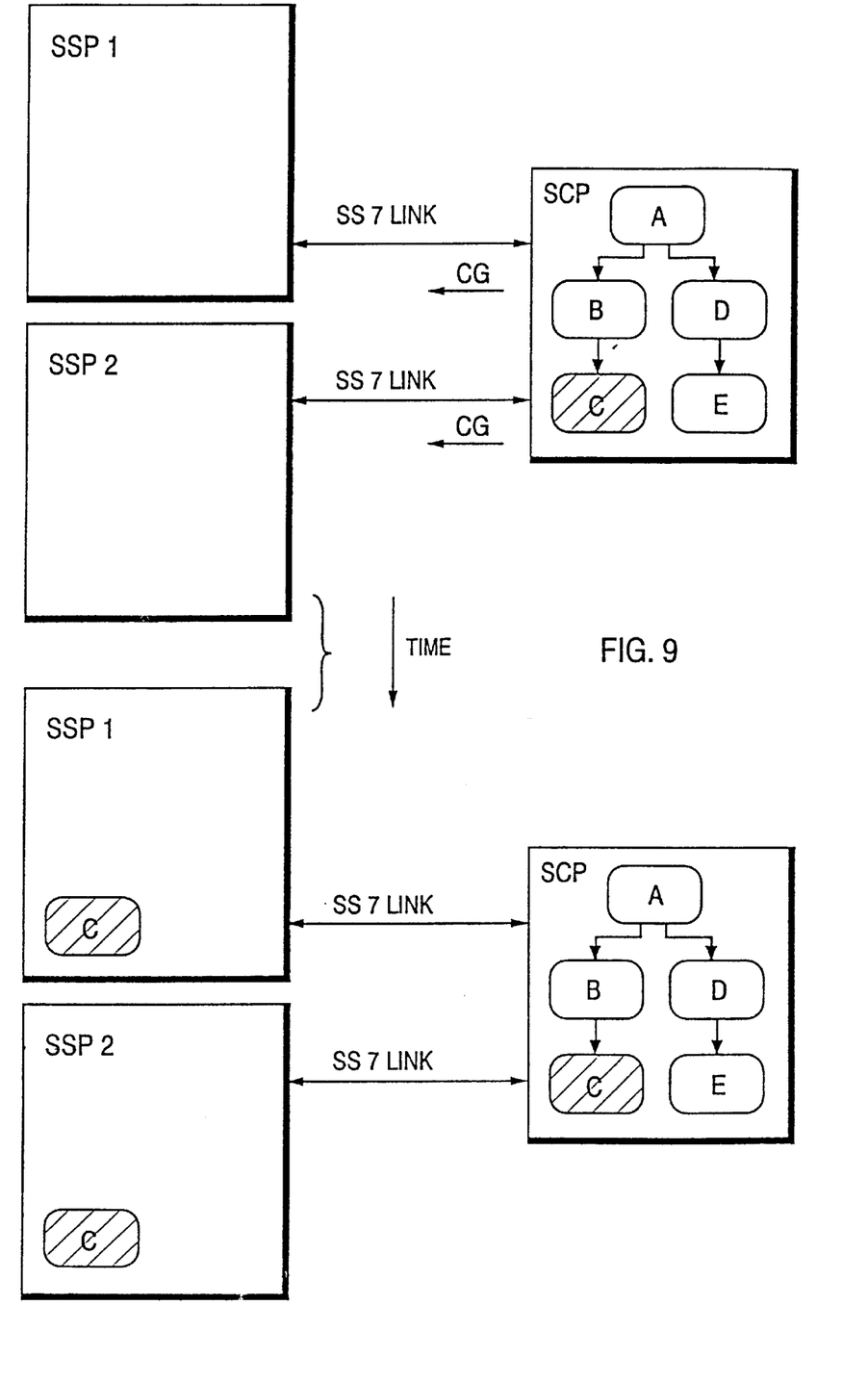
FIGS. 9 and 10 illustrate the operation of an intelligent network in a loading situation.

When a call gapping request arrives at an SSP, the SSP creates, based on the information it has received, an image of the sending gapping gate (i.e. the subsystem controlled by the gapping gate). This is illustrated in FIG. 9, wherein the overloaded block (C) is denoted by hatching and the call gapping request transmitted by the SCP by the reference CG. By means of the gap criteria and this image, the SSP identifies the traffic that is directed to the overloaded subsystem and restricts the rate of this traffic. When the period of time indicated in the call gapping request expires, the SSP destroys the image of the subsystem from its memory.

The gapping gate in the SCP is "static", i.e. it exists all the time. The image of the gapping gate (or the corresponding subsystem) in the SSP is temporary; the SSP creates the image when it receives a call gapping request and destroys it when the duration T specified in the call gapping request has expired. When the SSP receives a call gapping request containing the same gap criteria as an already existing image, the other parameters of that image will be updated to correspond to the new ones.

Another approach is to view the images (copies) in the SSP as objects with two states: active and passive. When an image receives a call gapping request, it turns active and starts to restrict traffic. When the image is in the active state it can receive several call gapping requests from the SCP. When the duration specified in the last call gapping request expires, the image turns passive again.

Figure 10:
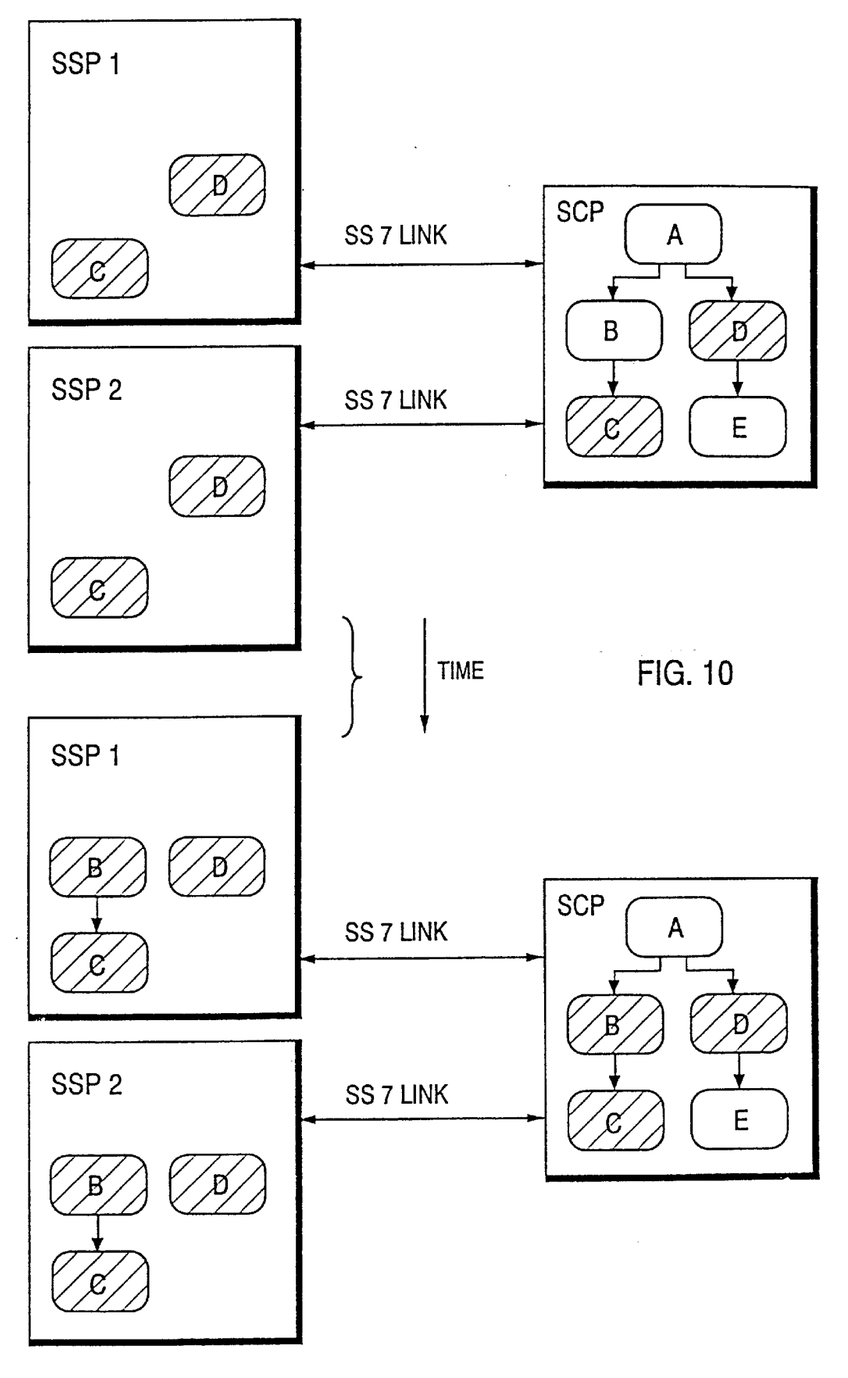

When two of the subsystems in the SCP are simultaneously overloaded, there is correspondingly an image (copy) of each gate in the SSP. As more and more subsystems become overloaded, the logical structure of the images in the SSP starts to resemble the hierarchy of the gapping gates in the SCP. This process is illustrated in FIG. 10.

The aforementioned ETSI standard (Item 7.3.19.1.1) also defines a special "call gap encountered" indicator, which the SSP adds to the initial message if the call has passed through the gapping gate. This indicator thus informs the SCP that the concerned SSP performs call gapping. However, the SCP cannot be certain that the SSP performs the call gapping with the correct parameters, wherefore the SCP cannot trust this indicator in making decisions about whether to send a call gapping request or not. An example of this is a network which comprises one SCP and several SSPS, and in which network one of the SCP subsystems is on the load level L1 having a corresponding upper limit U, to be indicated to the SSP, of e.g. 10 initial messages (10 calls) per second. If the load level now changes from L1 to L2, having a corresponding upper limit of e.g. 5 initial messages (5 calls) per second, the SCP transmits a call gapping request CG containing a new upper limit to each SSP. In this situation, if the data of some SSPs will not be updated, for example due to faults, then these SSPs continue restricting the traffic with the old (higher) value of U until the duration indicated in the call gapping request expires. Due to this, the concerned subsystem may move further to the next load level L3. The SCP cannot distinguish between updated and non-updated SSPs, since the same indicator is received from all SSPs.

There have been efforts to solve the problem in the manner described in the beginning, so that the same call gapping request is repeated after each initial message arriving from the SSP. However, this arrangement produces (a) more traffic over the signalling link between the SCP and the SSP, and (b) repeated updating of the information (subsystem images), concerning the SCP, in the SSP.

Figure 11:
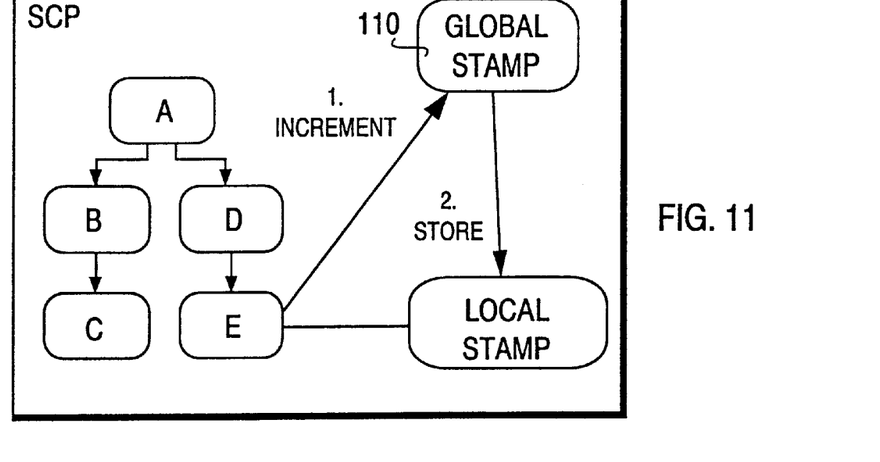
FIG. 11 illustrates the operation according to the invention in a service control point (central node of the network of the intelligent network, FIG. 12a is a flow chart illustrating the transmission of a restriction request from a service control point, FIG. 12b shows schematically the means of the network central node performing the operation according to the invention, FIG. 13 illustrates the addition of the stamp according to the invention to a restriction request message to be transmitted from a service control point in the intelligent network, FIG. 14 illustrates the addition of the stamp array according to the invention to the initial message transmitted from an peripheral node in the intelligent network, and FIG. 15 is a flow chart illustrating the transmission of a restriction request from a service control point, according to a preferred embodiment of the invention.

According to the present invention, the operation proceeds in such a way that the central node SCP maintains in its memory, by means of, e.g., a counter, an integer which is called in this connection a "global stamp". Initially the value of the stamp is zero. When the load level of any subsystem of the central node changes (i.e. the restriction parameters change), the corresponding gapping gate increments the value of the global stamp by one, reads the value of the new stamp and stores it in its internal data. The stored stamp is called in this connection a "local stamp". The value of the local stamp identifies, at any moment of time, the restriction parameters used by that gapping gate (and the concerned subsystem). The principle is illustrated in FIG. 11, wherein the counter is denoted by reference numeral 110 and the local stamp is shown only for the subsystem E, for the sake of clarity.

When a gapping gate transmits a call gapping request, it adds this local stamp to the call gapping request message CG transmitted to a peripheral node. When the peripheral node SSP receives this call gapping request message, it stores the value of the stamp in the message to the data of the corresponding image (copy). After this, if a call from a peripheral node passes through the call gap control, the initial message to be transmitted contains this stamp identifying the restriction parameters used by the peripheral node.

Figure 12A:
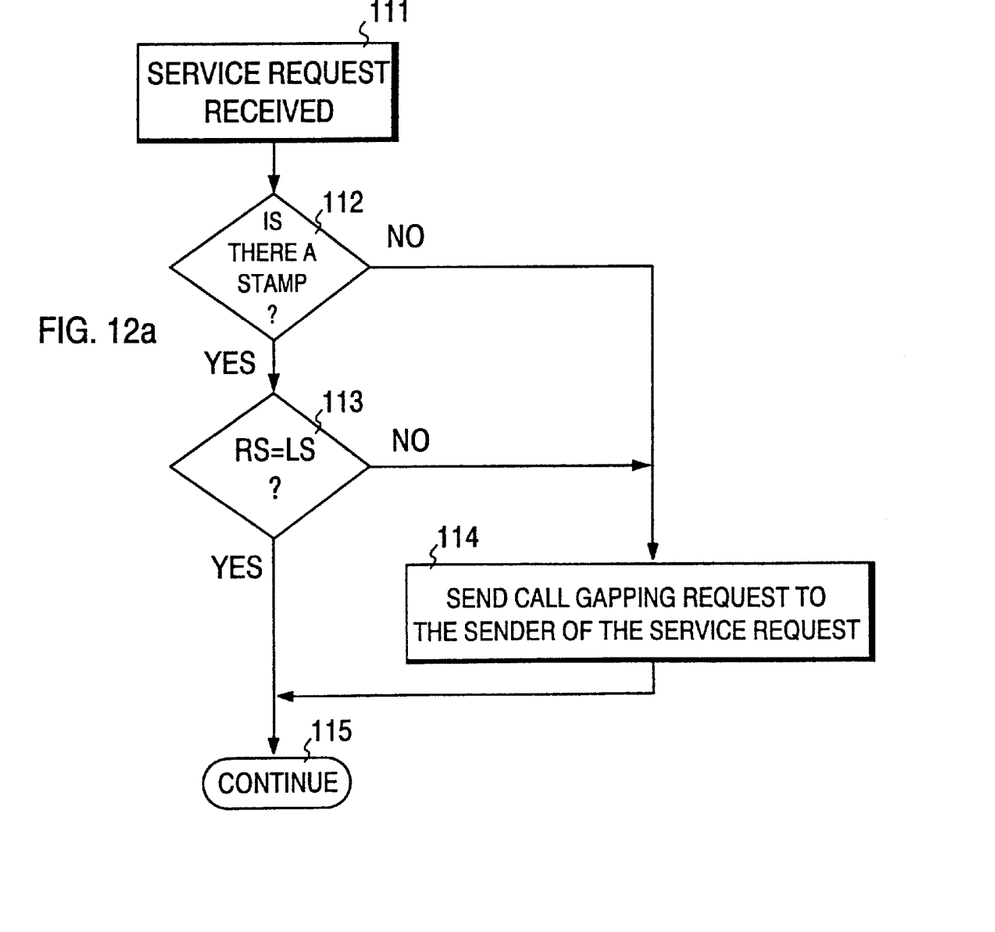

In the central node, the gapping gate decides, in the manner shown in FIG. 12a, on the transmission of a call gapping request. A received initial message is first examined to see if it contains a stamp (phase 112). If the received initial message contains no stamp, it means that the peripheral node SSP does not have the image of the central node gapping gate (i.e. the peripheral node does not restrict the calls). A call gapping request is then transmitted (phase 114). If the received initial message contains a stamp, its value RS is either equal to or different from the value of the local stamp LS. If the examination performed in phase 113 shows that the values are equal, then the image of the gapping gate is correctly updated and no call gapping request will be transmitted. If the values are different, a call gapping request will be transmitted to the concerned peripheral node (phase 114).

The transmission of the call gapping request can also be described in the following manner:

transmit a call gapping request if there is no stamp in the initial message or if the stamp of the service request message≠local stamp.

Figure 12B:
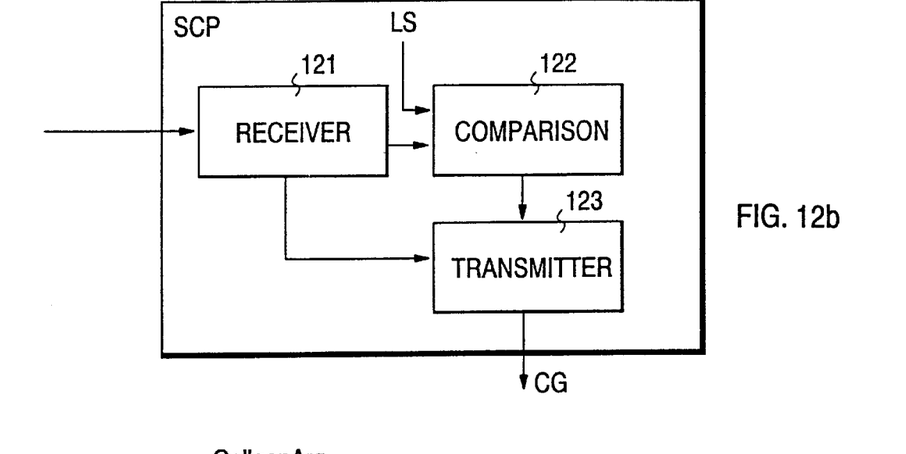

At least one pair of comparing means 122 have thus been added to the central node, as shown in FIG. 12b, the comparing means comparing the stamp received from the receiver means 121 with the local stamp LS, and controlling the node transmitting means 123 to transmit a call gapping request CG according to the result of the comparison.

The aforementioned ETSI standard (Item 7.3.6.11) defines four different gap criteria, one of which is the called address. As it was already described above, the SCP can be seen as a hierarchial structure of subsystems, wherein the traffic of each subsystem is controlled by a gapping gate. Such a subsystem is the part of the SCP having its own unique gap criteria. This also means that the less precisely the gap criteria are determined, the greater the portion of the traffic they relate to, and the higher the position of the corresponding subsystem in the hierarchy. For example a subsystem having the criteria "called address starts with number 3" is higher up in the hierarchy than a subsystem having the criteria "called address starts with numbers 314". When the SSP contains at least two active images (copies) which are located one after another in the above-described hierarchy, for example subsystems A, B and C in FIG. 11, it must be decided how to restrict calls to these subsystems. The SSP can contain for example two images in such a way that in the first image the criterion is "called address starts with numbers 800" and the maximum rate U is 10 initial messages/s, and in the second image the criterion is "called address starts with numbers 80012" and the maximum rate U is 5 initial messages/s. When a subscriber dials, for example, the number "800123", it is possible in principle to filter that call according to the parameters of either image. However, using the parameters of the first image is incorrect, since then the gate which created the image located at a lower level in the hierarchy may receive as many as 10 initial messages/s, even though only 5 initial messages/s are allowed. Neither is it right to use the parameters of the second image only, whereas using the parameters of both images in the call gapping provides the correct result in all cases. When the call data matches the gap criteria of several active images, the call must pass through the call gap control of all these images. If the call cannot pass through all the images (gates), it will be rejected.

The principle described in the previous paragraph has the following effect on the present invention. The initial message must contain an array of stamps; that array contains the stamps (stamp values) of all the active images the call has passed. The array may thereby be empty (no stamps) or there may be one or several stamps. The gapping gate of the subsystem of the central node SCP examines whether the array contains the value of its own local stamp. If the value is absent, the gate transmits a call gapping request to the SSP.

Figure 13:
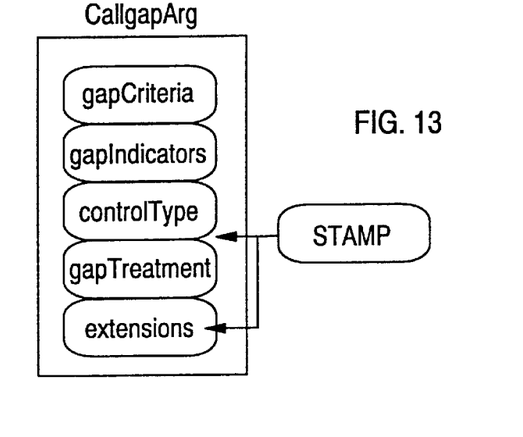

According to the invention, additional data, a stamp or a stamp value identifying the restriction parameters used in the SCP is added to the data field concerning call gapping in the message to be transmitted from the SCP. The data field, referred to in the standards as "CallGapArgument", to be transmitted in the call gapping request message is shown in FIG. 13. For the sake of clarity, the figure shows the fields with the same names they are disclosed with in the standard. Gap criteria, gap indicators, control type, gap treatment and extension are in succession within the data field. Control type and gap treatment are optional. The extensions form a free space that the manufacturers can utilize in several ways. According to the invention, the stamp is either added between some of the aforementioned fields as a separate field, or it may be placed inside the extensions. The advantage of the latter alternative is that such a call gapping request message complies fully to the present standard.

It is also possible that the stamps of two or more simultaneously overloaded subsystems are placed in the same call gapping request message. The message then contains two or more CallGapArgument data fields and correspondingly at least two stamps.

Figure 14:
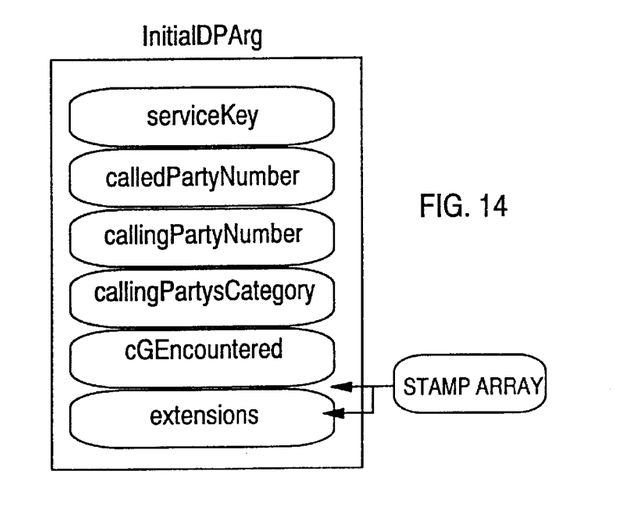

The aforementioned array of stamps is added to the initial message transmitted from the SSP. FIG. 14 shows the data field of the initial message (referred to in the standard as the InitialDPArg). The data field of the initial request message contains the service key, called party number, calling party's number, calling party category, the aforementioned call gap-encountered indicator and the extensions. According to the invention, the stamp array (containing one or several stamps if the SSP performs call gapping, or no stamps if the SSP does not perform call gapping) is added either between some fields as a separate field or the stamp array is placed within the extensions. The advantage of the latter is again that this kind of initial message complies fully with the present standard.

Since the size of the global stamp is in practice limited, it cannot be incremented forever. If the size of the variable is, for example, one octet (8 bits), its maximum value is $2^8-1=255$. When a gapping gate tries to increment a stamp that is at its maximum, the value will not increase, but it will jump back to zero (roll-over of the counter).

After this, it is possible that two or more gapping gates have the same local stamp value. The frequency of occurrence of such an event depends on the relative speed with which the gates update their restriction parameters and on the maximum value of the counter. The problem resulting from the roll-over of the counter can be completely ignored, however, especially if it is certain that it does not occur too often. If it is not certain, the problem can be avoided in such a way that the roll-over provides a new value for the stamp of each gate, even if the restriction parameters of the gate have not changed. The call gapping requests transmitted after this provide new stamp values for the images of gates in the peripheral nodes.

Instead of a counter to be incremented, the global stamp can naturally also be maintained with a counter that is decremented. Instead of an integer maintained by the counter, the global stamp may in principle consist of any data that uniquely identifies the restriction parameters, for example of the current value of the central node clock.

While a call gapping request is on its way to the central node, the peripheral node may transmit some initial messages with the old stamp value. Each of these initial messages brings about the transmission of a call gapping request with a new stamp value from the central node. Thus due to the network delays, the call gapping request might have to be repeated several times.

According to a preferred embodiment of the invention, the above-described basic principle can be modified in such a way that the central node only examines a predetermined proportion of the total number of initial messages it has received. In the following, this predetermined proportion will be described with p ($0<p\leq1$). For a source (peripheral node) transmitting at a rate exceeding the threshold U (initial messages/second) this guarantees a call gapping request on average within at least $1/(pU)$ seconds. The advantage of this embodiment is that in the central node the amount of work due to comparison is reduced by $1/(1-p)$.

This kind of operation is preferably implemented in such a way that for each incoming initial message, a random number R, for which $0\leq R\leq1$ holds, is generated in the central node SCP. If this number is smaller than the parameter p, the array of stamps is examined. The decision-making can thus be described in the following manner:

examine the received stamp array, if $R<p$, where $0\leq R\leq1$, and $0<p\leq1$.

Figure 15:
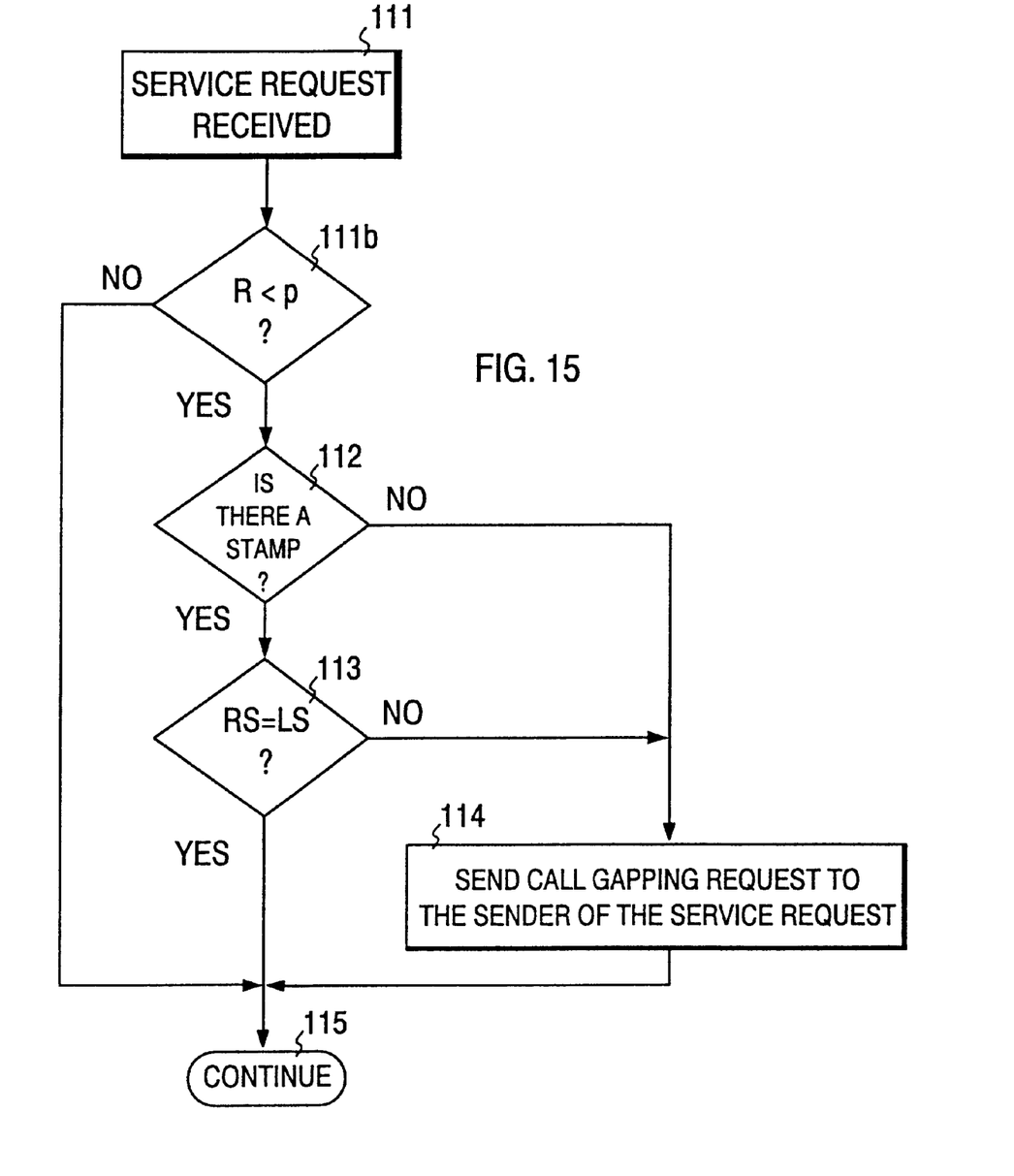

The operation is also illustrated in the flow chart of FIG. 15, which corresponds to the basic principle shown in FIG. 12, except that in this case the comparison of the random number R with the parameter p (phase 111b) is performed before the examination of the stamp (phase 112). If $R<p$, the operation continues in the above-described manner, but if $R\geq p$, then the array of stamps is not examined at all (i.e. the operation proceeds to phase 115).

The invention is described above with reference to the Intelligent Network. This means that the node providing services comprises several subsystems in the above-described manner. However, the method according to the invention is applicable in any network with a similar basic situation. This means that there might be only one subsystem in the node providing services, whereupon it is sufficient to transmit the value of a maximum of one stamp in the messages.

Even though the invention is described above with reference to the examples according to the accompanying drawings, it is clear that the invention is not restricted thereto, but it may be modified within the scope of the inventive idea disclosed above and recited in the appended claims. The method according to the invention can be applied for example in a certain part of the traffic. The number of the parameters used in the call gapping operation may also vary, wherefore a group of parameters must be understood as a group containing one or several parameters. Since the arrangement according to the invention can in principle be applied in any telecommunications network having the basic situation according to FIG. 1, the central node is referred to in the appended claims as a service node (not restricted to an Intelligent Network) and the peripheral node in turn as a node (not restricted to a star network). The service requests must also be understood to relate generally to any services the performance of which loads the service node.

I claim:

1. A method of preventing an overload in a telecommunications network node of a network having a service node and at least one other node from which the service node receives service requests, comprising the steps of:

said service node transmitting restriction requests to another said node connected thereto, so that said other node will restrict the number of service requests said other node transmits towards said service node, each said restriction request comprising a group of parameters indicating how said other node should perform a respective restriction, a said restriction request being transmitted by said service node to said other node at least whenever said group of parameters changes;

said service node including in each said restriction request information identifying a respective said group of parameters;

said other node in consequence of receiving each said restriction request copying the respective said information into a memory of said other node and transmitting data identifying the groups of parameters said other node uses, back to said service node; and said service node in regard to at least a proportion of said data as received thereby in consequence of receiving said data, comparing said data with the respective said information transmitted to said other node by said service node, and deciding on the basis of results of said comparing whether to transmit a next restriction request to said other node.

2. The method according to claim 1, wherein:

said other node when transmitting said data identifying the groups of parameters said other node uses, back to said service node transmits said data together with a respective said service request.

3. The method according to claim 1, further comprising:

said service node maintaining said data identifying group of parameters received thereby, by using a counter.

4. The method according to claim 3, further comprising:

said as a consequence of receiving said data rolling over such that all data identifying the groups of parameters used in said other node are changed in said service node.

5. The method according to claim 2, wherein:

said service node performs said comparing only to a predetermined proportion of a total number of service request received by said service node.

6. The method according to claim 1, further comprising:

said other node restricting the number of said service requests transmitted towards said service node are restricted by restricting the number of said service requests transmitted by said other node per time unit.

7. The method according to claim 1, further comprising:

said other node restricting the number of said service requests transmitted towards said service node by restricting the number of said service requests transmitted by said other node towards said service node to a certain percentage of a total number of service requests.

8. A network service node in a telecommunications network having at least one said service node and at least one other node from which the said service node, in use, receives service requests, said service node comprising:

transmitting means arranged to transmit restriction requests to said other node, so that said other node will restrict the number of service requests said other node transmits towards said service node, each such restriction request including information identifying a respective group of parameters indicating how said other node should perform restriction, said service node being arranged to have said transmitting means transmit a respective restriction request at least whenever said group of parameters changes such that said other node, in consequence of receiving each said restriction request, copies said information into a memory of said other node, and transmits to said service node data identifying the groups of parameters said other node uses to perform restriction;

comparing means for comparing data stored in said service node identifying a respective said group of parameters to corresponding data received from said other node for at least a proportion of said data as received by said service node, the comparing means being operationally connected to said transmitting means to control transmission by said transmitting means of restriction requests from said service node to said other node based on results of said comparing, such that deciding whether to send each next said restriction request is based on respective said results.

9. The method according to claim 1, wherein:

each said group of parameters, and therefore each said restriction request is restriction-specific as to each of a plurality of subsystems of said service node.

10. A method for preventing an overload in a service node which receives service requests from at least one other node and which includes a plurality of subsystems which are subject to being overloaded at least partially independently of one another, by restricting service requests from said other nodes to said service node on a subsystem-specific basis, said method comprising the steps of:

said service node including in a restriction request which said service node transmits to said other node, information identifying a group of parameters indicating subsystem by subsystem for each of a plurality of subsystems how said other node should restrict service requests to be transmitted by said other node to said service node;

said other node copying said information into a memory of said other node, and transmitting information back to said service node as to how said other node will restrict service requests to be transmitted by said other node to said service node;

said service node comparing said information as transmitted to said other node, with said information as transmitted by said other node, and, upon finding a difference as a result of said comparing, said service node sending a new subsystem-specific restriction request to said other node.

11. The network service node of claim 8, wherein:

said service node is arranged to provide each restriction request so as to be restriction-specific as to each of at plurality of subsystems of said service node.

* * * * *